United States Patent [19]
Briese

[11] Patent Number: 5,975,811
[45] Date of Patent: Nov. 2, 1999

[54] CUTTING INSERT CARTRIDGE ARRANGEMENT

[75] Inventor: Leonard Arden Briese, Harbor City, Calif.

[73] Assignee: Briese Industrial Technologies, Inc., Harbor City, Calif.

[21] Appl. No.: 08/903,593

[22] Filed: Jul. 31, 1997

[51] Int. Cl.[6] .................................................... B23C 5/20
[52] U.S. Cl. ............................ 407/40; 407/46; 407/47; 407/64
[58] Field of Search .................................. 407/64, 40, 36, 407/41, 46, 47, 48, 49, 62, 65

[56] References Cited

U.S. PATENT DOCUMENTS

| | | |
|---|---|---|
| 191,241 | 5/1877 | Kimball . |
| 972,969 | 10/1910 | Wittich . |
| 1,238,707 | 8/1917 | Bardeen . |
| 1,415,339 | 5/1922 | Hall ........................................ 407/64 X |
| 1,438,876 | 12/1922 | Thomas . |
| 1,542,007 | 6/1925 | Schroeder . |
| 1,577,952 | 3/1926 | Carnegie . |
| 1,692,919 | 3/1928 | Bailey . |
| 1,723,381 | 8/1929 | Seifert . |
| 1,747,908 | 2/1930 | Seifert . |
| 1,790,613 | 1/1931 | Gildersleeve et al. . |
| 1,812,475 | 6/1931 | Gildersleeve et al. . |
| 1,945,854 | 2/1934 | Hall ........................................ 407/64 X |
| 2,054,311 | 9/1936 | Adams . |
| 2,180,823 | 11/1939 | Harrison . |
| 2,860,855 | 11/1958 | Vincent . |
| 2,862,286 | 12/1958 | Williams . |
| 2,886,293 | 5/1959 | Carr et al. . |
| 2,906,146 | 9/1959 | Flannery et al. ........................ 407/47 X |
| 3,049,033 | 8/1962 | Benjamin et al. . |
| 3,106,972 | 10/1963 | Thornsberry . |
| 3,163,246 | 12/1964 | Vagins et al. . |
| 3,262,184 | 7/1966 | Sweeny . |

(List continued on next page.)

FOREIGN PATENT DOCUMENTS

| | | |
|---|---|---|
| 776939 | 11/1934 | France . |
| 713 504 | 10/1941 | Germany . |
| 385676 | 9/1971 | U.S.S.R. . |
| 523 761 | 10/1976 | U.S.S.R. . |
| 607660 | 5/1978 | U.S.S.R. . |
| 607770 | 9/1948 | United Kingdom . |
| 2057939 | 4/1981 | United Kingdom . |

OTHER PUBLICATIONS

Leonard A. Briese—Jul. 1996 "Harts Petroleum Engineer International", Disc Cutter Bits Offer Potential Penetration Rates, p. 11.

*Primary Examiner*—Andrea L. Pitts
*Assistant Examiner*—Henry W. H. Tsai
*Attorney, Agent, or Firm*—Don Finkelstein

[57] ABSTRACT

An improved cutting insert cartridge arrangement for quick and easy mounting of cutting inserts to and removal from a rotary cutting tool, comprising a cutting insert receiver for the cutting insert, the insert receiver itself being quickly and easily removed from the rotary cutting tool body. The cutting insert receiver may have an outer end portion with an opening therein for receiving a cutting insert, the outer end portion being configurable to apply a varying lateral grasping force against an inserted cutting insert. The cutting insert receiver may be frusto conical in shape to mate with a complementary frusto conical recess in the rotary cutting tool body, whereby securing the receiver in the recess serves to apply the lateral grasping force against an inserted cutting insert due to the camming action between the mating surfaces of the two frusto conical members. Alternatively, a movable holder for holding the insert receiver may be coupled to the cutting insert receiver and slidable axially relative thereto to configure the outer end portion to increase grasping holding force against an inserted cutting insert in a first axial position of the movable holder, and to diminish grasping holding force against an inserted cutting insert in a second axial position of the movable holder.

13 Claims, 3 Drawing Sheets

U.S. PATENT DOCUMENTS

| | | |
|---|---|---|
| 3,434,553 | 3/1969 | Weller . |
| 3,759,625 | 9/1973 | Iversen . |
| 3,765,496 | 10/1973 | Flores et al. . |
| 4,047,826 | 9/1977 | Bennet . |
| 4,086,972 | 5/1978 | Hansen . |
| 4,093,392 | 6/1978 | Hopkins . |
| 4,190,125 | 2/1980 | Emmerich et al. . |
| 4,215,955 | 8/1980 | Lillie . |
| 4,337,980 | 7/1982 | Krekeler ................................ 407/46 X |
| 4,381,162 | 4/1983 | Hosoi . |
| 4,477,211 | 10/1984 | Briese . |
| 4,511,006 | 4/1985 | Grainger . |
| 4,610,317 | 9/1986 | England et al. . |
| 4,614,463 | 9/1986 | Hughes . |
| 4,621,955 | 11/1986 | Briese . |
| 4,627,503 | 12/1986 | Horton . |
| 4,645,386 | 2/1987 | Smith . |
| 4,648,760 | 3/1987 | Karlsson et al. . |
| 4,682,916 | 7/1987 | Briese . |
| 4,733,735 | 3/1988 | Barr et al. . |
| 4,733,995 | 3/1988 | Aebi . |
| 4,751,972 | 6/1988 | Jones et al. . |
| 4,796,713 | 1/1989 | Bechem et al. . |
| 4,817,742 | 4/1989 | Whysong . |
| 4,819,748 | 4/1989 | Truscott . |
| 4,893,967 | 1/1990 | Briese . |
| 4,936,719 | 6/1990 | Peters . |
| 4,940,369 | 7/1990 | Aebi et al. . |
| 4,946,318 | 8/1990 | David et al. . |
| 4,984,944 | 1/1991 | Pennington, Jr. et al. . |
| 4,993,888 | 2/1991 | Briese . |
| 5,028,175 | 7/1991 | Pawlik . |
| 5,038,859 | 8/1991 | Lynde et al. . |
| 5,099,929 | 3/1992 | Keith et al. . |
| 5,103,922 | 4/1992 | Jones . |
| 5,160,232 | 11/1992 | Maier . |
| 5,163,490 | 11/1992 | Meis ..................................... 407/46 X |
| 5,220,967 | 6/1993 | Monyak . |
| 5,226,489 | 7/1993 | Woods et al. . |
| 5,287,937 | 2/1994 | Sollami et al. . |
| 5,311,959 | 5/1994 | Adams . |
| 5,363,932 | 11/1994 | Azar . |
| 5,429,199 | 7/1995 | Sheirer et al. . |
| 5,433,281 | 7/1995 | Black . |
| 5,456,329 | 10/1995 | Dennis et al. . |
| 5,458,210 | 10/1995 | Sollami . |
| 5,458,211 | 10/1995 | Dennis et al. . |

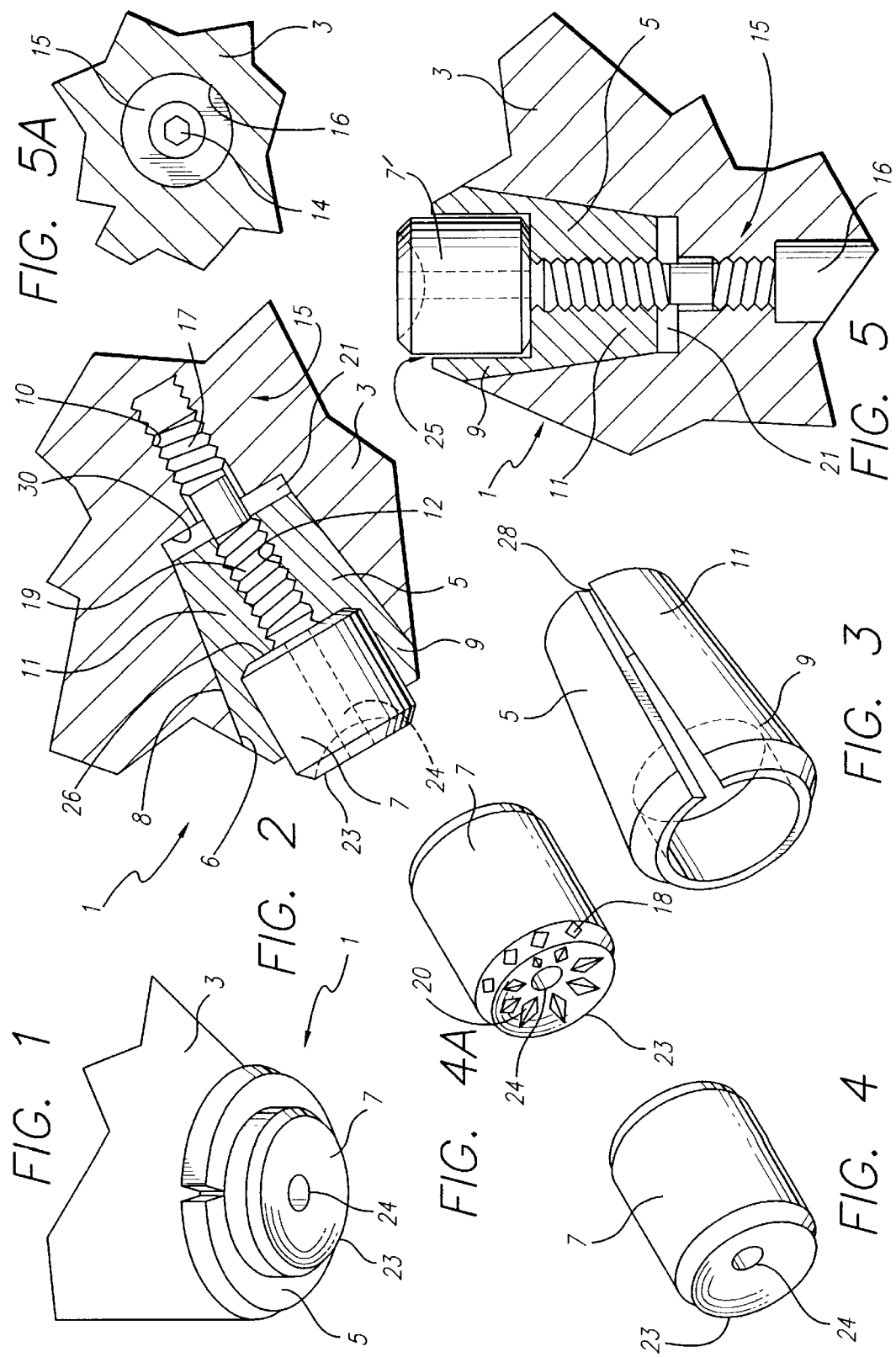

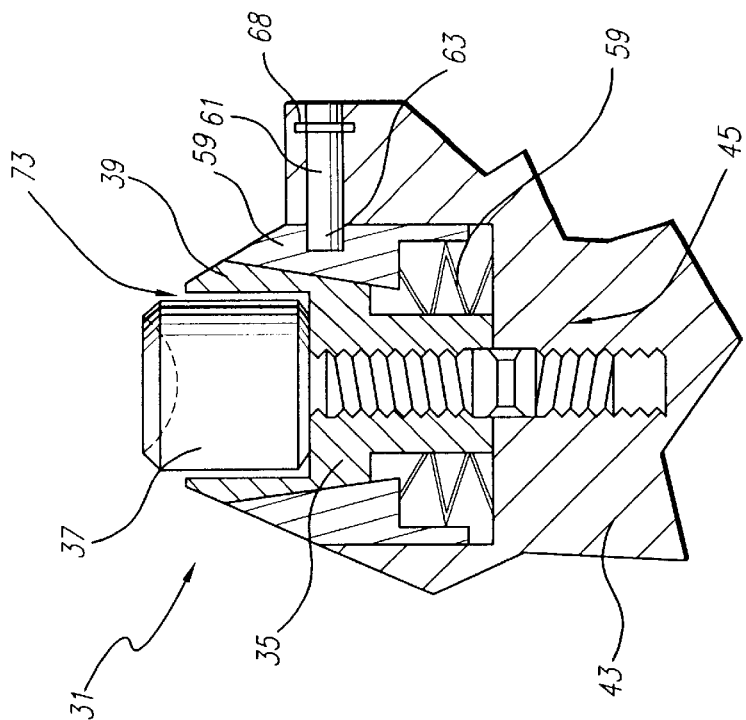
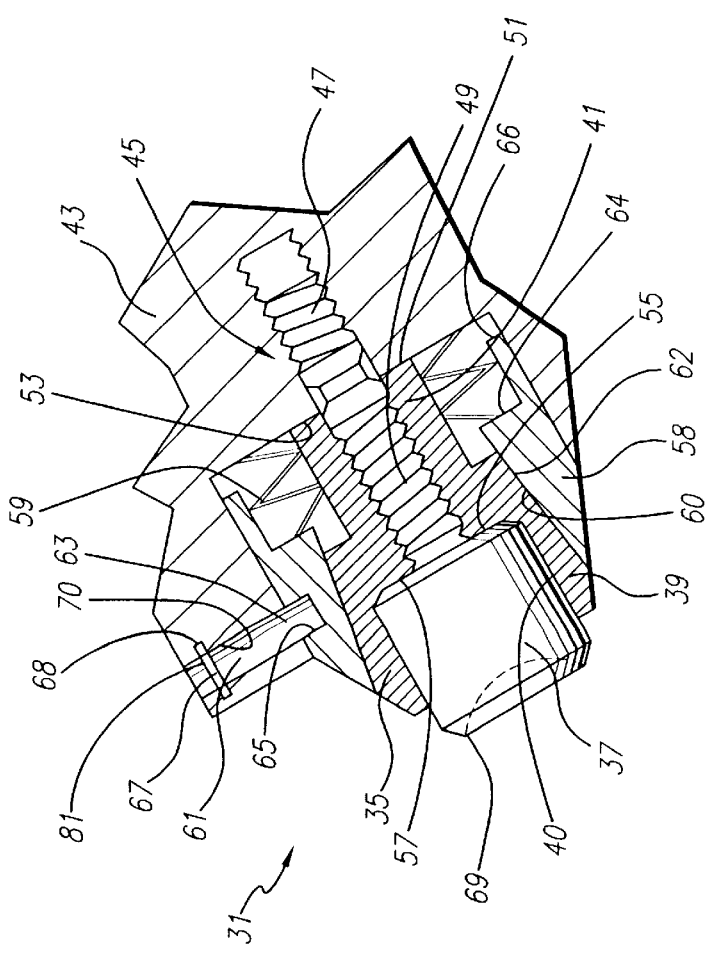

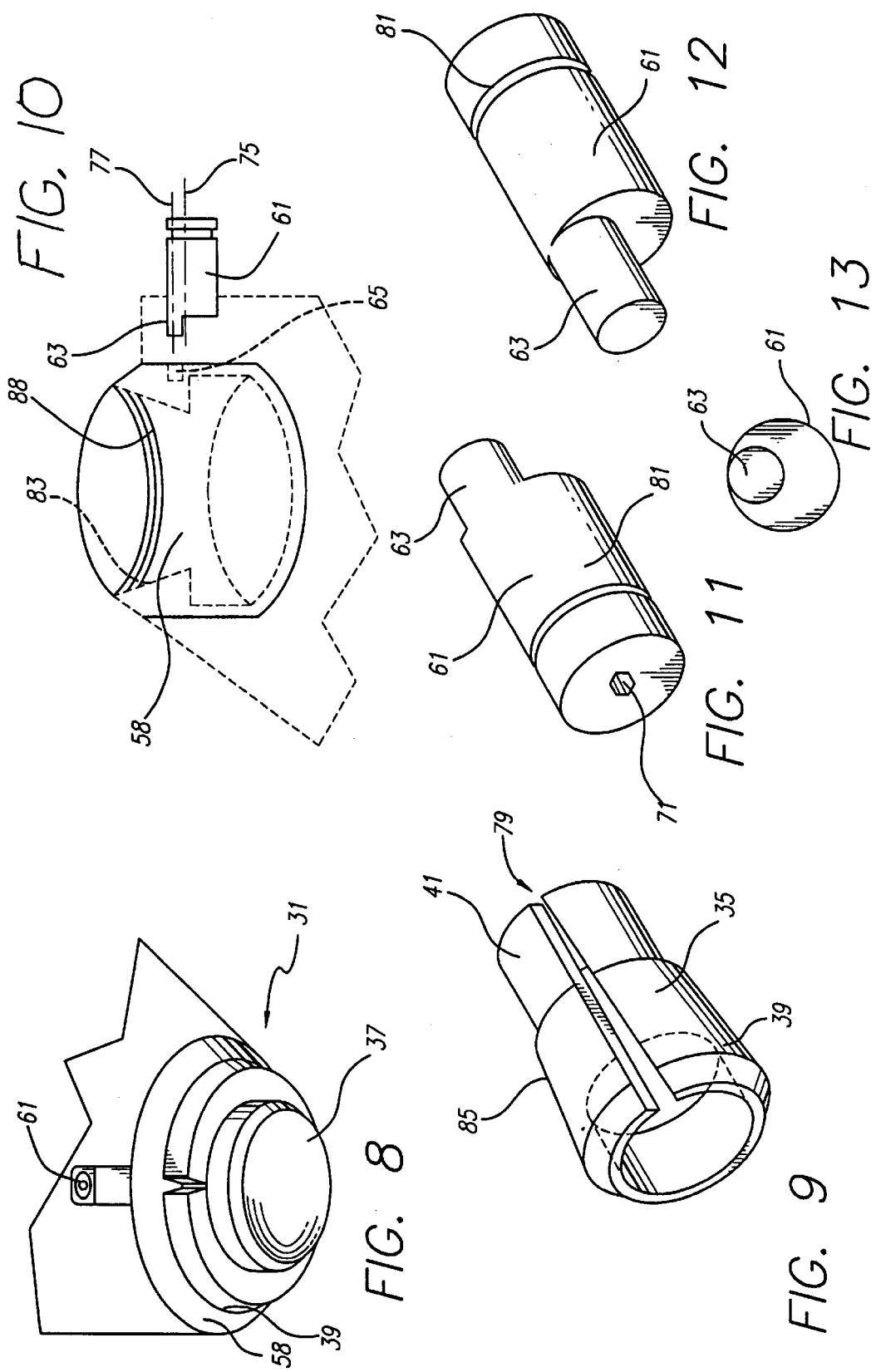

CUTTING INSERT CARTRIDGE ARRANGEMENT

BACKGROUND OF THE INVENTION

1. Field of the Invention

The present invention is related to the field of rotary cutting tools, and more particularly to a cutting insert holder which facilitates easy removal and replacement of the cutting elements or cutting inserts used with rotary cutting tools.

2. Brief Description of the Prior Art

Rotary cutting tools are well known in the art. Such cutting tools have long been utilized in many fields of endeavor, such as the material shaping field, stone and concrete grinding, road surfacing, mining, tunnel construction, etc. In addition to the large sized road construction, mining, and tunnel construction machines, such cutting tools are commonly used in relatively small sized tools such as milling machines, lathes, boring tools, planing tools, etc. Cutting tools for these uses generally have one or more cutting inserts mounted thereon such that the cutting insert is fixed relative to its mounting or rotational with respect to such mounting. The cutting tool causes the cutting insert to engage the workpiece to cut a predetermined amount of material therefrom. In such cutting tools, many are provided with means for adjusting the position of the cutting insert with respect to a nominal or "zero" plane. Where more than one cutting insert is utilized on the tool, it is desirable to have all of the cutting inserts precisely adjusted to the same position with respect to the zero plane. Such adjustment, of course, is also desired in cutting tools in which only a single cutting insert is provided.

In some prior art rotary cutting tools, the cutting inserts are mounted on the cutting surface of the tool by use of a bolt or the like extending through the center of the insert and into a protruding base portion of the rotary cutting tool.

It is often desired to change the physical size of the cutting insert depending upon the machine operation being performed. Cutting tools heretofore available have, in general, not been able to accept cutting inserts of more than one size.

In many of the heretofore available cutting tools, it has been a comparatively time-consuming task to make the necessary adjustment of the cutting insert or inserts toward and away from the zero plane, and/or comparatively complex cartridge arrangements for holding the cutting inserts have been utilized with the consequent increase in cost and decrease in reliability associated with larger numbers of components.

Also, in the past, replacement of damaged or dulled cutting inserts involved a major disassembly of a rotary cutting tool. Such disassembly procedure is time-consuming, inconvenient, generally costly, and can involve a substantial waste of machining operating time.

There are some notable exceptions to the aforementioned lack in the prior art of addressing the several problems in the field of rotary cutting tools. Specifically, U.S. Pat. No. 4,477,211 provides cutting insert cartridges that permit new cutting inserts for rotary cutting tools to be easily, quickly, and cheaply replaced or installed. In U.S. Pat. No. 4,828,436, a cartridge assembly for a cutting insert in a rotary cutting tool is provided offering a high degree of precision adjustment of the cutting insert. Both rotating and fixed cutting inserts are shown in the '436 patent to be utilized interchangeably, and the removal and replacement of a cutting element is shown to be easily and quickly accomplished. The present invention offers an even further improvement over the inventions according to these prior U.S. patents by providing an extremely easily operated cutting insert removal and replacement function, as well as providing the ability to remove and replace the cutting insert holding cartridge for exchange with another cutting insert holding cartridge which will accept a different size cutting insert, all while maintaining a very precise zero plane position for the cutting edge of each cutting insert.

SUMMARY OF THE INVENTION

The present invention overcomes the deficiencies of the prior art as noted above by providing an improved cutting insert cartridge arrangement for quick and easy mounting of cutting inserts to and removal from a rotary cutting tool, comprising a cutting insert receiver for the cutting insert, the insert receiver itself being quickly and easily removed from the rotary cutting tool body.

In one aspect of the invention, a cutting insert cartridge arrangement is provided for mounting to and removal from a rotary cutting tool body, comprising a cutting insert receiver having an outer end portion with an opening therein for receiving a cutting insert, the outer end potion being configurable to apply a varying grasping or gripping force against an inserted cutting insert.

The cutting insert receiver has an outer camming surface, while the cavity in the rotary cutting tool body has an inner camming surface. A coupler is provided for coupling the cutting insert receiver to the rotary cutting tool body while effecting mutual camming engagement between the two camming surfaces. As a result of the camming action between the two camming surfaces, the configurable cutting insert receiver is configured to increase the gripping force of the cutting insert receiver against an inserted cutting insert as the cutting insert receiver moves toward the rotary cutting tool body, and the camming engagement between the two surfaces configures the cutting insert receiver to decrease the gripping force of the cutting insert receiver against an inserted cutting insert as the cutting insert receiver moves away from the rotary cutting tool body to facilitate removal of the cutting insert.

Preferably, the cutting insert receiver and rotary cutting tool body have opposite-hand internal threads for receiving the opposite ends of a differential screw, whereby rotation of the differential screw in one direction draws the two members together while rotation in the other direction causes them to tend to separate.

In an embodiment where the cutting insert receiver functions as a collet, the outer surface of the cutting insert receiver is conical, and the cavity in the rotary cutting tool has complementary tapered conical sidewalls, as the differential screw is rotated to draw the cutting insert receiver into the rotary cutting tool body, the cutting insert receiver collapses radially inwardly due to the camming action of the two conical surfaces sliding against one another to increase the gripping force of the cutting insert receiver against an inserted cutting insert.

In a preferred embodiment, the cutting insert receiver has an outer end portion with an opening therein for receiving a cutting insert, the outer end portion of the receiver being configurable to apply a varying lateral grasping force against an inserted cutting insert. The cutting insert receiver may be frusto conical in shape to mate with a complementary frusto conical recess in the rotary cutting tool body, whereby securing the receiver in the recess serves to apply the lateral grasping force against an inserted cutting insert due to the camming action between the mating surfaces of the two frusto conical members and the collapsing of the collet-like receiver.

In another embodiment, a movable holder for holding the insert receiver is coupled to the cutting insert receiver and slidable axially relative thereto to configure the outer end portion to increase grasping holding force against an inserted cutting insert in a first axial position of the movable holder, and to diminish grasping holding force against an inserted cutting insert in a second axial position of the movable holder.

According to one aspect of the invention, a biasing member is provided for biasing the movable holder toward its first position, and an operating member is provided for coupling and acting between the rotary cutting tool body and the movable holder to move the movable holder against the biasing member to diminish the grasping holding force sufficiently to release, for removal, a cutting insert received in the cutting insert receiver.

Due to a fixed position for the cutting insert receiver relative to the rotary cutting tool body, an inserted cutting insert is always disposed with its cutting edges at the zero plane position.

Positioning the cutting edges at the zero plane position is especially accurate in an embodiment employing a movable holder for the insert receiver. That is, the cutting insert receiver has a machined inner base end portion for fitting solidly against a mating machined surface within a cavity in the rotary cutting tool body. Furthermore, the cutting insert receiver is machined to have a precise spacing between its inner base end portion and the bottom of the opening which receives the cutting insert. With the cutting insert also having a precision machined base contacting the bottom of the opening in the cutting insert receiver, and also having a precise dimension between its base and the cutting edge, the position of the cutting edge of the insert will be located at the precise zero plane position to whatever accuracy has been chosen for the machining of the contacting parts so described.

In any of the preferred embodiments, the cutting insert receiver, at least at its open outer end portion, may take the form of an axially split collet. Of course, the cutting insert receiver may be split along its entire axial length, if desired. As every machinist knows, when bits are placed in a collet, and the collet is collapsed to apply a grasping force against the shank of the bit, the bit can move slightly in the axial direction, thereby affecting the zero plane position of the cutting edge. Employing the construction elements and configuration according to the present invention avoids this problem, since the "collet", i.e. the collapsible portion of the cutting insert receiver, is not movable axially within the rotary cutting tool body, and the cutting insert receiver is precisely fixed axially relative to the rotary cutting tool body.

In yet another aspect of the invention, a biasing member is provided, preferably in the form of a compression spring tending to move the movable holder away from the rotary cutting tool body and act on the cutting insert receiver to increase the grasping pressure on a cutter insert held in the opening of the cutting insert receiver. In this way, the compression spring means is effective to automatically cause the cutting insert receiver to grasp the cutting insert.

An operating member may then be manually actuated to move the movable holder to more tightly press the cutting insert receiver about the cutting insert. Moving the operating member in the opposite direction, i.e. moving the movable holder against the compression spring action, diminishes the grasping force sufficiently so that a user may simply withdraw the cutting insert from the cutting insert receiver. To replace the cutting insert, the user reverses that process. That is, the user manipulates the operating member to move the movable holder against the compression spring, inserts the new cutting insert, and then releases the operating member, upon which the compression spring moves the movable member outwardly to again collapse the "collet" portion of the cutting insert receiver to again grasp the replaced cutting insert.

For mounting the cutting insert cartridge arrangement to the rotary cutting tool body, the cutting tool insert receiver is provided with internal threads axially located on an inner end portion thereof. The rotary cutting tool body also has internal threads axially aligned with the internal threads on The cutting insert receiver inner end portion. The threads in the rotary cutting tool body are of the opposite-hand direction than the threads in the cutting insert receiver.

The cutting insert cartridge arrangement further comprises a differential screw having left-hand external threads at one end and right-hand external threads at the other end, whereby, after starting to thread its ends into the cutting insert receiver and into the rotary cutting tool body, rotation of the differential screw means in one direction pulls the cutting insert receiver and rotary cutting tool body together. Likewise, rotation of the differential screw means in the opposite direction pushes the cutting insert receiver and rotary cutting tool body apart, allowing quick and easy replacement of the cutting insert cutting arrangement, either to replace a damaged one, or to replace it with a cutting insert cutting arrangement for holding a different size cutting insert.

The drawing of the cutting insert receiver toward the rotary cutting tool body, due to the construction of the cutting insert cartridge arrangement, also draws the cartridge arrangement into a cavity in the rotary cutting tool body. In one embodiment, this action clamps the cutting insert in the receiver. In the embodiment employing a receiver holder, such action solidly fixes the cutting insert receiver to the rotary cutting tool body. Then, after the cutting insert cartridge arrangement is fully seated and tightened in place within the cavity in the rotary cutting tool body, the operating member is put in position to selectively activate the movable holder as hereinbefore described.

BRIEF DESCRIPTION OF THE DRAWING

The above and other objects of the present invention may be more fully understood from the following detailed description taken together with the accompanying drawings, wherein similar reference characters refer to similar elements throughout, and in which:

FIG. 1 is a perspective view of a cutting insert cartridge arrangement in accordance with the present invention mounted to a rotary cutting tool body, the figure showing only a fragmentary portion of the rotary cutting tool body;

FIG. 2 is a partial cross sectional view of an embodiment of the invention employing a collapsible taper lock feature and a differential screw arrangement, the figure also showing a cutting insert grasped and held in place by a cutting insert receiver;

FIG. 3 is a perspective view of a cutting insert receiver for receiving and retaining a removable cutting insert;

FIG. 4 is a perspective view of a cutting insert of the type that can be received by the cutting insert cartridge arrangement constructed in accordance with the invention;

FIG. 4A is a view similar to FIG. 4, but with the cutting insert having a plurality of exterior and interior flutes on the surfaces forming the cutting edge for the cutting insert;

FIG. 5 is a view similar to that of FIG. 2 but with the taper lock having released its grasping force against the cutting insert for allowing easy removal of the cutting insert;

FIG. 5A is a view from the bottom of FIG. 5, showing a rear access opening for an installation/adjustment tool;

FIG. 6 is a partial cross sectional view of a second embodiment of the invention showing the cutting insert cartridge arrangement mounted in a rotary cutting tool body, only a fragment of the rotary cutting tool body being shown in this figure;

FIG. 7 is a view similar to that of FIG. 6 showing the cutting insert cartridge arrangement in a condition to diminish the grasping force on the cutting insert sufficiently for removal of the cutting insert;

FIG. 8 is a perspective view of the alternative embodiment of the invention shown in FIGS. 6 and 7, employing a cutting insert receiver and a movable holder for holding the insert receiver;

FIG. 9 is a perspective view of the cutting insert receiver employed in the second described embodiment of the invention;

FIG. 10 is a side perspective view of a cutting insert receiver employed in the second embodiment of the invention, schematically showing the relationship with an operating member;

FIG. 11 is a perspective view of an operating member for diminishing or releasing grasping pressure on a cutting insert by the second embodiment of the invention;

FIG. 12 is a perspective view of the operating member of FIG. 11 showing the opposite end of the operating member; and FIG. 13 is a front elevational view of the operating member shown in FIG. 12.

DETAILED DESCRIPTION OF THE PREFERRED EMBODIMENTS

FIG. 1 is a perspective view of a cutting insert cartridge arrangement 1 in accordance with the present invention, mounted to a rotary cutting tool body 3, the figure showing only a fragmentary portion of the rotary cutting tool body 3.

Referencing FIGS. 1–5, a cutting insert receiver 5, in a preferred embodiment functioning as a collet, is mounted in the rotary cutting tool body 3 and, when so mounted, applies a grasping force to hold a cutter insert 7 in a proper and predetermined orientation and at a zero plane position for the cutting edge 23 of the cutting insert 7. A hole 24 is provided in insert 7 for insertion of an installation/locking/releasing tool for both mounting the cutting insert cartridge arrangement 1 in the rotary cutting tool body 3, and for selectively locking and releasing the cutting insert 7 within the cutting insert receiver 5. Details of the installation of the cutting insert cartridge arrangement and operation of the grasping and releasing functions of the cutting insert 7 will be described hereinafter.

FIG. 2 is a partial cross sectional view of a first embodiment of the invention employing a collapsible taper lock feature and a differential screw arrangement. The figure also shows a cutting insert 7 held in place by a cutting insert receiver 5.

In FIG. 2, a differential screw 15 mounts the cutting insert receiver 5 into the rotary cutting tool body 3 initially, and, upon inserting a cutting insert 7 into the outer open end portion 9 of the cutting insert receiver 5, further turning of the differential screw 15 serves to collapse at least the outer end portion 9 of cutting insert receiver 5 to grasp the cutting insert 7 sufficiently to hold it in place for cutting action.

More particularly, it will be noted that the differential screw 15 has left hand threads 17 at one end and right hand threads 19 at the other. The rotary cutter tool body 3 has a left hand threaded bore 10, and the inner base end portion 11 of cutting insert receiver 5 has a right hand threaded bore 12.

In an installation procedure for installing the receiver 5 in body 3, the differential screw 15 is threaded into body 3 by turning the differential screw counterclockwise from the front, e.g., by a tool passing through hole 24 in the cutting insert 7, or, at least initially by applying a tool to the outer end of the right hand threaded portion 19 of the differential screw 15. For this function, a slot, allen wrench socket, or Phillips cross point depression (not shown) may be provided in the end of the right hand thread section 19. The next step in the installation procedure is to screw the receiver 5 onto the right hand threads 19 of the differential screw 15 in a clockwise direction while holding screw 15, if necessary, from turning. Then, the screw 15 is loosened slightly by turning it clockwise a few turns, and, while holding the screw 15 at that position, the receiver 5 is turned further down the screw threads 19 until it seats in a cavity of the rotary tool body 3 with surfaces 6 and 8 being in surface contact. The final step is then to tighten screw 15 (counterclockwise), and if a cutting insert 7 is in place, the further movement of screw 15 counterclockwise will cause a camming action between conical surfaces 6 and 8 to collapse the cutting insert receiver 5, if it is slit along its entire length axially, or, at least, the outer end portion 9 collapses radially inwardly to lock the insert 7 in the receiver 5.

Further aspects of this unique construction aid in retaining the insert 7 in place. First, the position of the cutting edge 23 is such that material being cut tends to rotate the cutting insert 7 counterclockwise, as viewed from the front. Such counterclockwise forces simply tend to move the left hand threads 10 further into body 3 and the right hand threads 19 further into receiver 5, thereby tending to draw these two bodies further together. Secondly, the angles for the inner conical surface 6 of body 3 and the outer conical surface 8 of receiver 5 are chosen to effect a taper lock action when they are mutually engaged.

FIG. 3 is a perspective view of a cutting insert receiver 5 showing a slit 28 extending the entire length of the receiver 5, the entire body of receiver 5 collapsing radially inwardly or expanding radially outwardly as the differential screw 15 is turned counterclockwise or clockwise, respectively. It will be understood that the embodiments shown in FIGS. 1–5 are members of a first preferred embodiment, and other configurations would be evident to the skilled worker. For example, the cutting insert receiver 5 may have a cylindrical inner base end portion 11, and a conical outer end portion 9, and the rotary cutting tool body 3 may have a cavity with a complementary shape allowing for axial movement of the cutting insert receiver 5, but with only the outer end portion 9 slit axially to act as a collet portion of the receiver 5. Additionally, other mounting devices may be employed to couple the cutting insert receiver 5 to the body 3 other than a differential screw 15. All that is required is that a cutting insert receiver 5 be drawn toward the rotary cutting tool body 3 to effect a camming action on a collet-like member for grasping a cutting insert 7 and locking it into position.

It should also be further appreciated that the taper of the sides of surfaces 6 and 8 may be formed by precision machining such that, with a given diameter cutting insert 7 and a given diameter for the opening in outer end portion 9, the distance from the bottom 26 of insert 7 to the bottom 30 of the cavity in rotary cutting tool body 3 will be precise. Moreover, the axial length of the cutting insert 7 can obviously be machined to great precision, so that the distance between the cutting edge 23 of the insert 7 and the bottom 30 of the body cavity 3 will likewise be a precision dimension repeatedly achievable upon each removal and insertion of a fresh cutting insert 7.

These precision dimensions are important when considering that a number of cutting inserts, in their insert cartridges, are positioned along a rotary cutting tool body 3 in a predetermined plane perpendicular to the axis of rotation of the body 3, and to achieve the most efficient cutting and to insure that the cutting inserts 7 all wear relatively evenly, positioning the cutting edges 23 of each of the plurality of cutting inserts 7 is extremely important. The present invention as described above achieves this goal.

The axial length of cutting insert receiver 5 is chosen to leave a space 21 when surfaces 6 and 8 achieve a taper lock condition. This is simply a safety factor to ensure that the taper lock effect will be achieved before the cutting insert receiver 5 could possibly seat against the bottom 30 of the cavity in rotary cutting tool body 3.

FIG. 4 is a perspective view of a typical cutting insert 7 showing a frusto conical nose portion having a cutting edge 23. A hole 24 for the installation and operation of the cutting insert cartridge arrangement is shown in FIG. 4.

In FIG. 4A, a similar view as that of FIG. 4 is shown, but with the cutting insert 7 having a plurality of exterior 18 and interior 20 flutes on the surfaces forming the cutting edge 23 for the cutting insert 7. These sharp-edged flutes aid in chipping away the material being cut by the cutting insert 7, in providing breaking of chips in metal removal, in moving small particles away from the cutting/drilling process and away from the cutting edges to avoid clogging of the rotary cutting tool, and in providing forced rotation of rotary cutting inserts. It is to be understood that the design of the flutes shown in FIG. 4A are for illustrative purposes only, and any of a variety of patterns of sharp cutting edges on the cutting insert 7 faces can be formed, as desired. For example, instead of the diamond shaped V-grooves shown in FIG. 4A, facial sharp edges for the cutting insert 7 may be radial grooves, axially angular grooves, helical grooves, tapered grooves, or grooves in a feathered pattern or in a chevron pattern, to name a few.

In FIG. 5, it will be noted that the differential screw 15 has been turned clockwise (as viewed from the front) tending to push the cutting insert receiver 5 away from rotary cutting tool body 3 due to the opposite-handed screw threads acting on these two bodies. As a result, FIG. 5 shows the cutting insert receiver 5 raised slightly from the tool body 3, whereby the cutting insert receiver 5 is self-expanding to provide a slight gap 25 between the outer surface of cutting insert 7 and the walls of the opening in outer end portion 9 of the receiver 5. Since the cutting insert 7 is not in any other way attached to the body 3 or receiver 5, it is easily removed by hand and replaced by a fresh cutting insert 7, after which the differential screw 15 is rotated counterclockwise to bring receiver 5 back toward body 3 and, again, effect a collet grasping action against insert 7 by cutting insert receiver 5 in the manner previously described.

As an alternate installation and adjustment (collet release) arrangement for the cutting insert cartridge arrangement 1, FIG. 5A shows an optional rear access opening 16 in the rotary cutting tool body 3 in which an installation/adjustment tool (not shown) may be inserted for turning differential screw 15. The tool may be, for example, a hex driver fitting into a complementary hex opening 14 in the end of differential screw 15. This arrangement does not require the cutting insert 7' to have a through hole 24 as shown in the cutting insert 7 of FIGS. 1 and 2, for example. Thus, which installation/adjustment structure is to be used is determined by whether or not rear access to the differential screw 15 is available, and if so, further determined at the option of the equipment designer.

FIG. 6 is a figure similar to that of FIG. 2, but with some additional features. Like components to those shown and described with respect to FIGS. 1–5 will not be repeated, as the person of ordinary skill in the art will appreciate the similar functions of such elements of the invention.

FIG. 6 is a partial cross sectional view of the second embodiment of the invention showing the cutting insert cartridge arrangement 31 mounted in a rotary cutting tool body 43, only a fragment of the rotary cutting tool body being shown in this figure. In this embodiment, a differential screw 45 is likewise provided with left hand threads 47 screwed into a complementary threaded bore in rotary cutting tool body 43 and right hand threads 49 screwed into a complementary threaded bore in insert receiver 35.

The FIG. 6 embodiment employs a cutting insert receiver 35 taking the form of a collet and having the ability to collapse radially inwardly or expand radially outwardly to grasp or release a cylindrical cutting insert 37, as hereinbefore described.

However, in the FIG. 6 embodiment, it is the cutting insert receiver 35 which is first mounted, without a cutting insert 37 in place, to the body 43 by an installation similar to that described with respect to FIG. 2. Upon tightening of the differential screw 45 by a tool having access to the outer end of the right hand thread portion 49 of screw 45, the cutting insert receiver 35 will have its precision machined inner end portion 51 seated against a similarly precision machined surface 53 at the bottom of the cavity in rotary cutting tool body 43.

Prior to mounting the cutting insert receiver 35 to body 43, however, a movable holder 58 and a spring 59 are inserted over the outside of cutting insert receiver 35, assembled as shown in FIG. 6. The spring 59 may be any preferred form of compression spring, the FIG. 6 embodiment showing a number of alternately flipped belville springs 59. A helical compression spring could be used instead, if desired.

It will be noted that, in the fully inserted and locked condition of cutting insert 37, the movable holder 58 has a conical interior surface 60 mating with and taper locking with the outer conical surface 62 of the cutting insert receiver 35. The spring arrangement 59 pushes against the bottom 53 of the cavity in body 43 and against a radially inwardly directed planar shoulder 64 of movable holder 58. Since cutting insert receiver 35 is fixed to body 43, the action of the spring arrangement 59 is effective to cam the inner conical surface 60 against the outer conical surface 62 of the receiver 35, thereby forcing the cutting insert receiver 35 to collapse radially inwardly and apply a grasping force to the outer cylindrical surface of cutting insert 37.

It will be noted that, with the rear end 66 of the movable holder 58 spaced from the bottom 53 of the cavity in body 43, the movable holder 58 may be pushed axially inwardly against the action of the spring arrangement 59, thereby releasing the taper lock hold between the contacting conical surfaces 60 and 62. As a result of the movement of movable holder 58 axially inwardly, the cutting insert receiver 35 self-expands radially outwardly to provide a gap between the outer surface of cutting insert 37 and the inner surface of opening 40, as best seen in FIG. 7 showing a gap 73 being produced at that interface.

Importantly, an even closer tolerance on the position of the cutting edge 69 in the zero plane of the rotary cutting tool 43 is achieved by this second embodiment of the invention as compared to the embodiment shown in FIGS. 1–5. In the second embodiment just described, extremely close tolerances can be held in the machining of bottom 53 of the body 43, inner end portion 51 of the cutting insert receiver 35, bottom surface 57 of the opening 40 in receiver 35, and the axial length of the cutting insert 37 between the cutting edge 69 and the planar base surface 55. In this second embodiment, the loosening and/or tightening of the grasping of the cutting insert 37 by the receiver 35 is totally independent of the spacing between the cutting edge 69 and the bottom surface 53 of the body 43.

Although any of a number of tools may be employed to push the movable holder 58 axially rearwardly to relieve the taper lock and collet action holding the cutting insert 37 in place, a preferred embodiment of the invention employs an eccentric release pin or operating member 61 rotatable in a bore 70 formed in body 43. The operating member 61 is rotatable with respect to, but locked axially into, body 43 by a locking ring 67, e.g. a snap ring, engagable in an annular groove 81 formed in the operating member 61 and an annular groove 68 formed in body 43.

The operating member 61 has an activating portion, in the preferred embodiment taking the form of an eccentric boss 63 fitting into an off-center slot opening 65 in movable holder 58. The slot opening 65 is axially offset from the axis of rotation of operating member 61 and defines a short circumferential groove in the periphery of cutting insert receiver 35. The operating member 61 is rotatable in bore 70 by applying a screwdriver, allen wrench, or other similar tool to the outer end of operating member 61, the engagement part of operating member 61 receiving such a tool, shown in FIG. 11 as an allen.

Although spring assembly 59 pushes movable holder 58 to taper lock against cutting insert receiver 35, the taper lock set can enhanced by an operator rotating operating member 61 to manually move boss 63, and movable holder 58 axially outwardly. In a similar, but opposite, action rotation of operating member 61 in the opposite direction moves boss 63, and movable holder 58, axially inwardly to release the taper lock condition as illustrated in FIG. 7. FIG. 7 shows the boss 63 at a more inwardly position relative to body 43, and, likewise shows the spring arrangement 59 further collapsed and the taper lock released producing a gap 73 for the easy removal of cutting insert 37.

FIG. 8 is a perspective view of the second preferred embodiment, similar to the view in FIG. 1, but showing the additional movable holder 58 and the position of an operating member 61.

FIG. 10 is a schematic illustration of the cooperation between the operating member 61 and the movable holder 58. The axes of a cylindrical operating member 61 and a cylindrical boss 63 extending eccentrically therefrom is also shown in FIG. 10 for illustrative purposes. Finally, FIG. 10 also shows an optional feature of the invention, wherein an annular groove 88 may be provided at the most forward end of the movable member 58. As mentioned previously, a dedicated operating member 61 is not absolutely required to operate the invention, as any tool that can push axially inwardly the movable member 58 to release the taper lock and collet action described would suffice. Annular groove 88 simply makes this point more clear, as a tubular tool fitting in the annular groove 88, a forked tool having two or more tines fitting into annular groove 88 at spaced angular positions, or even a screwdriver or other instrument pushing against the nose of movable member 58 may serve to compress the compression spring arrangement 59 (FIGS. 6 and 7) sufficiently to release the cutting insert 37. It will therefore be understood that the operating member 61 is provided for a convenience factor only and is not an essential part of the invention.

FIG. 9 is a perspective view of the cutting insert receiver 35 showing an outer surface 85, an outer end portion 39, and the inner base end portion 41 as previously described. In the FIG. 9 embodiment, the cutting insert receiver 35 is axially slit along its entire length forming a slit 79. Again, if desired, only the outer end portion 39 need be slit to act as a collet for retaining the cutting insert 37.

FIGS. 11–13 show the operating member 61 in different views, these figures showing the eccentric nature of the boss 63 relative to the cylindrical operating member body 61, the annular groove 81 cooperating with a locking ring 67 (FIG. 6), and, in the example shown in FIG. 11, a hex opening 71 for insertion of an allen wrench for releasing and assisting in the locking of the movable holder 58 relative to the cutting insert receiver 35.

Another difference between the embodiment of FIGS. 6–13 as compared to that of FIGS. 1–5 is that, in the first embodiment, access to the end of differential screw 15 at the end 19 is necessary during installation of the cutting insert 7. Accordingly, an opening 24 was provided in insert 7 for the insertion of an appropriate tool to have access to the end of differential screw 15. In the second embodiment of the invention, the cutting insert receiver 35 is initally fully installed to the rotary cutting tool body 43 by turning differential screw 45 counterclockwise until the movable holder 58 is pressed tightly against bottom surface 53. A cutting insert 37 may, afterwards, be inserted by the turning of operating member 61 to push movable holder 58 against spring assembly 59 to release the cutting insert 37, and operating member 61 may simply be released to permit the movable holder 58 to be forced outwardly by spring assembly 59, again locking the cutting insert 37 in place. By this action, it will be appreciated that a solid cutting insert 37 may be provided, i.e. without any axial through hole.

While only certain embodiments of the invention have been set forth above, alternative embodiments and various modifications will be apparent from the above description and the accompanying drawing to those skilled in the art. These and other alternatives are considered equivalents and within the spirit and scope of the present invention.

What is claimed is:

1. A cutting tool cartridge arrangement for mounting to and removal from a rotary cutting tool body, comprising:
   a cutting insert receiver having an outer end portion with an opening therein for receiving a cutting insert, said outer end portion configurable to apply a varying grasping force against an inserted cutting insert; and
   a movable holder for holding said insert receiver, said holder coupled to said cutting insert receiver and slidable axially relative to the cutting insert receiver to configure said outer end portion to increase grasping holding force against the inserted cutting insert in a first axial position of said movable holder, and to diminish grasping holding force against an inserted cutting insert in a second axial position of said movable holder, to facilitate removal of the inserted cutting insert, and a biasing member for biasing said movable holder toward said first axial position.

2. The cutting tool cartridge arrangement as claimed in claim 1, comprising an operating member coupled and acting between the rotary cutting tool body and said movable holder to move said movable holder against said biasing member to diminish said grasping holding force sufficiently to release, for removal, a cutting inserted received in said cutting insert receiver.

3. The cutting tool cartridge arrangement as claimed in claim 1, wherein:

said cutting insert receiver has an inner base end portion opposite said outer end portion, said inner base end portion having an end surface contacting the rotary cutting tool body; and said cutting insert receiver has a seating surface at the bottom of said opening; whereby inserting a cutting insert of a fixed axial length into said opening until the cutting insert contacts said bottom of said opening will place the cutting insert at a precise predetermined zero plane position.

4. The cutting tool cartridge arrangement as claimed in claim 2, wherein:

said cutting insert receiver is a slotted collet having an outer surface having a taper, and said outer surface tapered inwardly toward the rotary cutting tool body;

said movable holder is an annular unslotted member having an inner surface having a taper, and said inner surface tapered inwardly toward the rotary cutting tool body, the taper of said movable holder inner surface being the same as that of said cutting insert receiver outer surface; and said biasing member is a compression spring means tending to move said movable holder away from the rotary cutting tool body and cam said outer tapered surface of said slotted collet inwardly with the tapered inner surface of said movable holder to increase grasping pressure by said cutting insert receiver on the inserted cutter insert inserted into said opening in said cutting insert receiver.

5. The cutting tool cartridge arrangement as claimed in claim 4, wherein the rotary cutting tool body has a bore into which said operating member snugly fits and is movable therein between a first operating member position and a second operating member position, said operating member having an activating portion coupled to said movable holder for moving said movable holder against the bias of said biasing means to diminish the grasping force on the inserted cutter insert by said collet when said operating member is moved to its second position.

6. The cutting tool cartridge arrangement as claimed in claim 5, wherein, after said operating member has been moved to its second position and then released, said biasing means moves said movable holder to cam said collet into a grasping relationship with the inserted cutter insert and to move said operating member back to its first position.

7. The cutting tool cartridge arrangement as claimed in claim 1, wherein:

said cutting insert receiver has internal threads axially located in an inner end portion;

the rotary cutting tool body has internal threads axially aligned with said internal threads on said cutting insert receiver inner end portion, the threads in the rotary cutting tool body being of the opposite-hand direction compared to the threads in said cutting insert receiver; and a connecting means which comprises a differential screw means having left-hand external threads at one end and right-hand external threads at the other end, whereby, after starting to thread its ends into said cutting insert receiver and into the rotary cutting tool body, rotation of said differential screw means in one direction pulls said cutting insert receiver and said rotary cutting tool body together, and rotation of said differential screw means in the opposite direction pushes said cutting insert receiver and said rotary cutting tool body apart.

8. A cutting insert cartridge arrangement for mounting to and removal from a rotary cutting tool body, the rotary cutting tool body having a cavity with internal sidewalls, at least a portion of the internal sidewalls defining a first cam surface, said cutting insert cartridge arrangement comprising:

a cutting insert receiver having an outer end portion with an opening therein for receiving a cutting insert, said outer end portion configurable to apply a varying grasping force against an inserted cutting insert, said cutting insert receiver having an outer surface defining a second cam surface;

a coupler for coupling said cutting insert receiver to the rotary cutting tool body while effecting mutual camming engagement between said first and second cam surfaces, said camming engagement configuring said configurable cutting insert receiver outer portion to increase said grasping force of said cutting insert receiver outer end portion against an inserted cutting insert as said coupler moves said cutting insert receiver toward the rotary cutting tool body, and said camming engagement configuring said configurable cutting insert receiver outer portion to decrease said grasping force of said cutting insert receiver outer end portion against the inserted cutting insert as said coupler moves said cutting insert receiver away from the rotary cutting tool body, to facilitate removal of the cutting insert;

said cutting insert receiver has internal threads axially located in an inner end portion;

the rotary cutting tool body has internal threads axially aligned with said internal threads on said cutting insert receiver inner end portion, the threads in the rotary cutting tool body being of the opposite-hand direction than the threads in said cutting insert receiver; and said coupler further comprises a differential screw means having left-hand external threads at one end and right-hand external threads at the other end, whereby rotation of said differential screw means in one direction after starting to thread its ends into said cutting insert receiver and into the rotary cutting tool body, pulls said cutting insert receiver and said rotary cutting tool body together, and rotation of said differential screw means in the opposite direction pushes said cutting insert receiver and said rotary cutting tool body apart.

9. The cutting insert cartridge arrangement as claimed in claim 8, wherein:

the cavity in the rotary cutting tool body has a bottom, and the cavity internal sidewalls in the rotary cutting tool body are tapered inwardly toward the bottom, the cavity internal sidewalls constituting the first cam surface; and said cutting insert receiver is a slotted collet having an outer surface tapered inwardly toward the rotary cutting tool body, said tapered outer surface constituting said second cam surface.

10. The cutting insert cartridge arrangement as claimed in claim 8, wherein said differential screw has a tool receiving axis at its axial end threadably received in said cutting insert receiver, said cutting insert receiver having an axial opening through which a tool can be passed axially to engage in said tool receiving axis of said differential screw, said cutting insert cartridge arrangement being especially adapted to receive cutting inserts having a central opening axially aligned with the opening in said cutting insert receiver and with said differential screw.

11. A cutting insert cartridge arrangement for mounting to and removal from a rotary cutting tool body, comprising:

a cutting insert receiver having an outer end portion with an opening therein for receiving a cutting insert, said outer end portion configurable to apply a varying grasping force against an inserted cutting insert; and wherein said cutting insert receiver has internal threads axially located in an inner end portion;

the rotary cutting tool body has internal threads axially aligned with said internal threads on said cutting insert receiver inner end portion, the threads in the rotary cutting tool body being of the opposite-hand direction compared to the threads in said cutting insert receiver; and said cutting insert cartridge arrangement further comprises a differential screw means having left-hand external threads at one end and right-hand external threads at the other end, whereby, after starting to thread its ends into said cutting insert receiver and into the rotary cutting tool body, rotation of said differential screw means in one direction pulls said cutting insert receiver and said rotary cutting tool body together, and rotation of said differential screw means in the opposite direction pushes said cutting insert receiver and said rotary cutting tool body apart.

12. The cutting cartridge arrangement as claimed in claim 11, wherein:

said cutting insert receiver has an inner base end portion opposite said outer end portion, said inner base end portion having an end surface spaced from the rotary cutting tool body; and said cutting insert receiver has a seating surface at the bottom of said opening and a tapered outer surface, and the rotary cutting tool body has a complementary tapered inner surface; whereby inserting a cutting insert of a fixed axial length into said opening until the cutting insert contacts said seating surface, and turning said differential screw until said tapered outer surface of said insert cutting receiver fits tightly against the complementary tapered inner surface of the rotary cutting tool body, will place the cutting insert at a precise predetermined zero plane position.

13. The cutting cartridge arrangement as claimed in claim 11, wherein said cutting insert receiver is a slotted collet having an outer surface tapered inwardly toward the rotary cutting tool body.

* * * * *